(12) United States Patent
Ue et al.

(10) Patent No.: US 6,577,617 B1
(45) Date of Patent: Jun. 10, 2003

(54) COMMUNICATION TERMINAL APPARATUS, BASE STATION COMMUNICATION APPARATUS AND RADIO COMMUNICATION METHOD

(75) Inventors: Toyoki Ue, Yokosuka (JP); Hidenori Kayama, Yokosuka (JP); Osamu Kato, Yokosuka (JP); Kazuyuki Miya, Kawasaki (JP); Mitsuru Uesugi, Yokosuka (JP); Takashi Kitade, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/359,127

(22) Filed: Jul. 23, 1999

(30) Foreign Application Priority Data

Sep. 7, 1998 (JP) .............................. 10-252992

(51) Int. Cl.$^7$ .............................................. H04B 7/212
(52) U.S. Cl. ........................................ 370/347; 370/280
(58) Field of Search ................................. 370/280, 337, 370/347, 335, 230, 277, 281, 294, 341, 348

(56) References Cited

U.S. PATENT DOCUMENTS

| | | | |
|---|---|---|---|
| 5,081,704 A | | 1/1992 | Umeda et al. |
| 5,226,045 A | * | 7/1993 | Chuang ........................ 370/332 |
| 5,229,995 A | | 7/1993 | Strawcynski et al. |
| 5,390,166 A | * | 2/1995 | Rohani et al. ............... 370/335 |
| 5,561,846 A | * | 10/1996 | Hagio ......................... 370/337 |
| 5,680,398 A | | 10/1997 | Robinson |
| 6,104,933 A | * | 8/2000 | Frodigh et al. ............. 455/522 |
| 6,144,656 A | * | 11/2000 | Kinnunen et al. .......... 370/347 |
| 6,370,359 B1 | * | 4/2002 | Ue et al. ..................... 455/69 |

FOREIGN PATENT DOCUMENTS

| | | |
|---|---|---|
| EP | 0419244 | 3/1991 |
| WO | 98/21909 | 5/1998 |

* cited by examiner

Primary Examiner—Nguyen T. Vo
Assistant Examiner—Nghi H. Ly
(74) Attorney, Agent, or Firm—Greenblum & Bernstein, P.L.C.

(57) ABSTRACT

The present invention carries out transmission/reception of broadcast channels using only the last downlink slot of subframes using signals having a TDMA structure according to a CDMA/TDD system, and thus flexibly handles various services and avoids problems of interference in self-operated services in particular. The base station communication apparatus repeatedly transmits information contained in broadcast channels by the number of times corresponding to the time-sharing number and appropriately allots uplink and downlink slots, thus making the most of the features of uplink open-loop transmission power control and base station transmission diversity.

16 Claims, 9 Drawing Sheets

COMMUNICATION TERMINAL APPARATUS, BASE STATION COMMUNICATION APPARATUS AND RADIO COMMUNICATION METHOD

BACKGROUND OF THE INVENTION

1. Field of the Invention

The present invention relates to a communication terminal apparatus such as a mobile station communication apparatus used for digital radio communications, base station communication apparatus and radio communication method.

2. Description of the Related Art

A multiple access system is used as a circuit-switching system when a plurality of stations carry out communications using a same band simultaneously in the digital radio communication field, and TDMA (Time Division Multiple Access) and CDMA (Code Division Multiple Access), etc. are examples of this. TDMA refers to Time Division Multiple Access, a multiple access technology that compresses an information signal on the time scale and carries out transmission/reception within an assigned time slot. On the other hand, CDMA refers to Code Division Multiple Access, a technology that implements multiple access through a spread spectrum communication that transmits an information signal by spreading its spectrum over a frequency band wide enough compared to the original information bandwidth. Here, a direct spreading system is a system that carries a sequence of spreading codes on an information signal as they are by spreading.

On the other hand, radio communication technologies conventionally use duplex systems such as FDD (Frequency Division Duplex) system and TDD (Time Division Duplex) system for the purpose of improving the communication efficiency. For example, TDD refers to a system using a same band for transmission/reception, and is also called a "ping-pong system" which carries out communications by time-sharing a same radio frequency for transmission and reception. Since the TDD system does not require an uplink/downlink pair band, it can be used not only for public services but also for local area or home services in many cases. The TDD system also has an advantage of its ability to facilitate asymmetric transmission rate services by flexibly handling differences in uplink/downlink traffic or services.

Some applications combine a multiple access communication system such as a TDMA or CDMA system above with an FDD or TDD communication system. A CDMA/TDD system in particular can efficiently increase the number of channels accommodated and is expected to be used widely in the future.

In the case of the CDMA/TDD system, transmitting data over one entire frame using different spreading codes for the uplink and downlink is believed to suppress the level of interference between systems as described in ARIB Volume 3 "Specifications of Air-Interface for 3G Mobile System (Ver.0.5).

Information specific to a base station apparatus such as downlink transmission power or uplink interference power is also transmitted over one entire frame via a spread broadcast channel (BCCH). However, if base station communication apparatuses come quite closer to each other, the amount of interference power increases even if different spreading codes are used, which may deteriorate the system characteristics.

Figure 1:
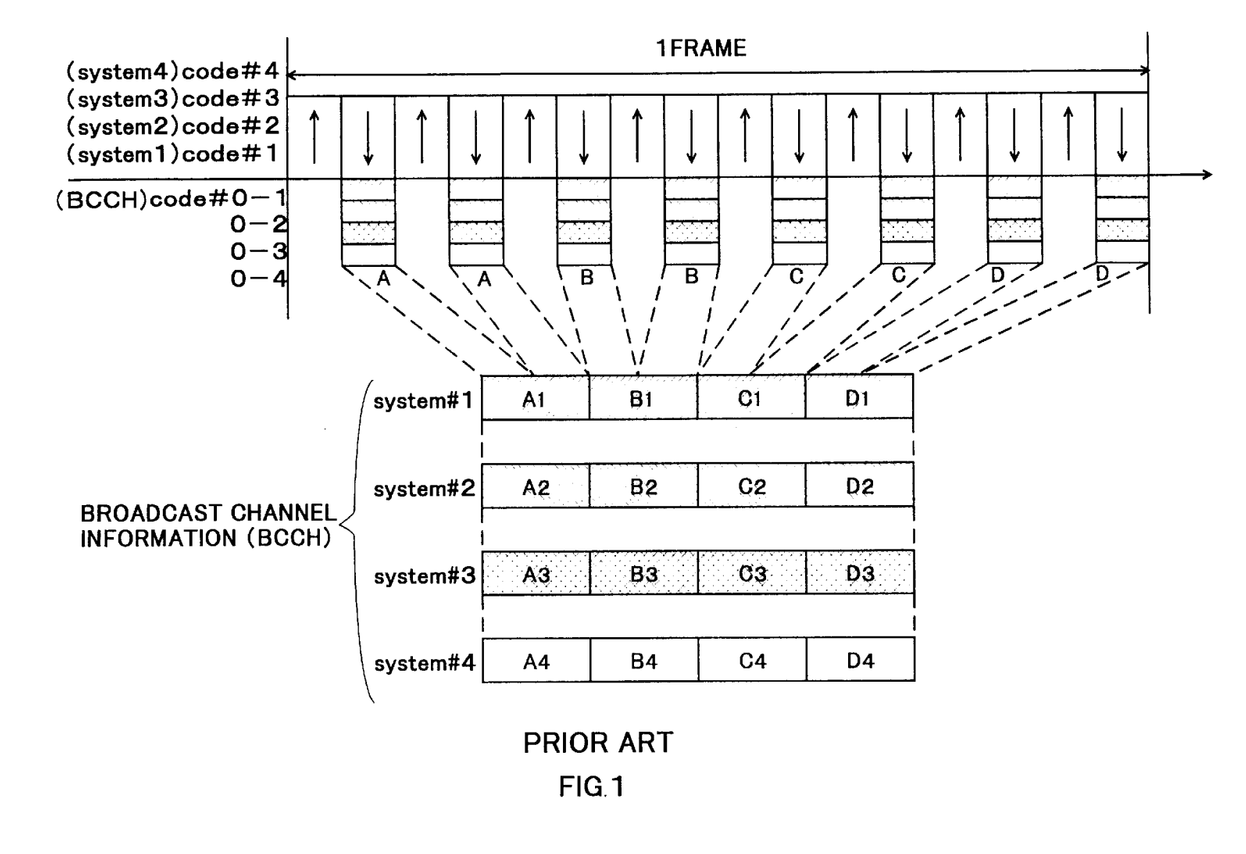
FIG. 1 is a frame diagram showing a structure of conventional broadcast channels.

FIG. 1 shows a downlink frame structure when a conventional CDMA/TDD system is introduced to home services and services symmetric between the uplink and downlink are carried out. As seen from FIG. 1, a communication channel and broadcast channel are split into a plurality of downlink slots and information to be transmitted is transmitted over one entire frame.

On the other hand, recent progress in the cellular system technology has made it possible to develop a self-operated (home-based) system that carries out communications by freely selecting the uplink and downlink locations of time slots in a signal frame. In this case, it is also important to consider common factors between a public service and home service. However, conventional systems are not applicable to such a self-operated system at all.

In FIG. 1, the broadcast channels in four systems use common slots, but the level of interference increases as the number of systems operating in the same area increases.

SUMMARY OF THE INVENTION

It is an objective of the present invention to provide a communication terminal apparatus, base station communication apparatus and radio communication method capable of suppressing interference between systems and commonly applicable to public and home services.

A main point of the present invention is to flexibly handle various services and avoid the problem of interference in self-operated services in particular by using signals having a TDMA structure in the CDMA/TDD system and carrying out transmission/reception of broadcast channels only with the last downlink slot of a subframe.

Another main point of the present invention is to make the most of features of uplink open-loop transmission power control and base station transmission diversity by a base station communication apparatus repeatedly transmitting information contained in broadcast channels by a number of times corresponding to the time-sharing number and allotting an appropriate number of slots for the uplink and downlink.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below.

Embodiment 1

Figure 2:
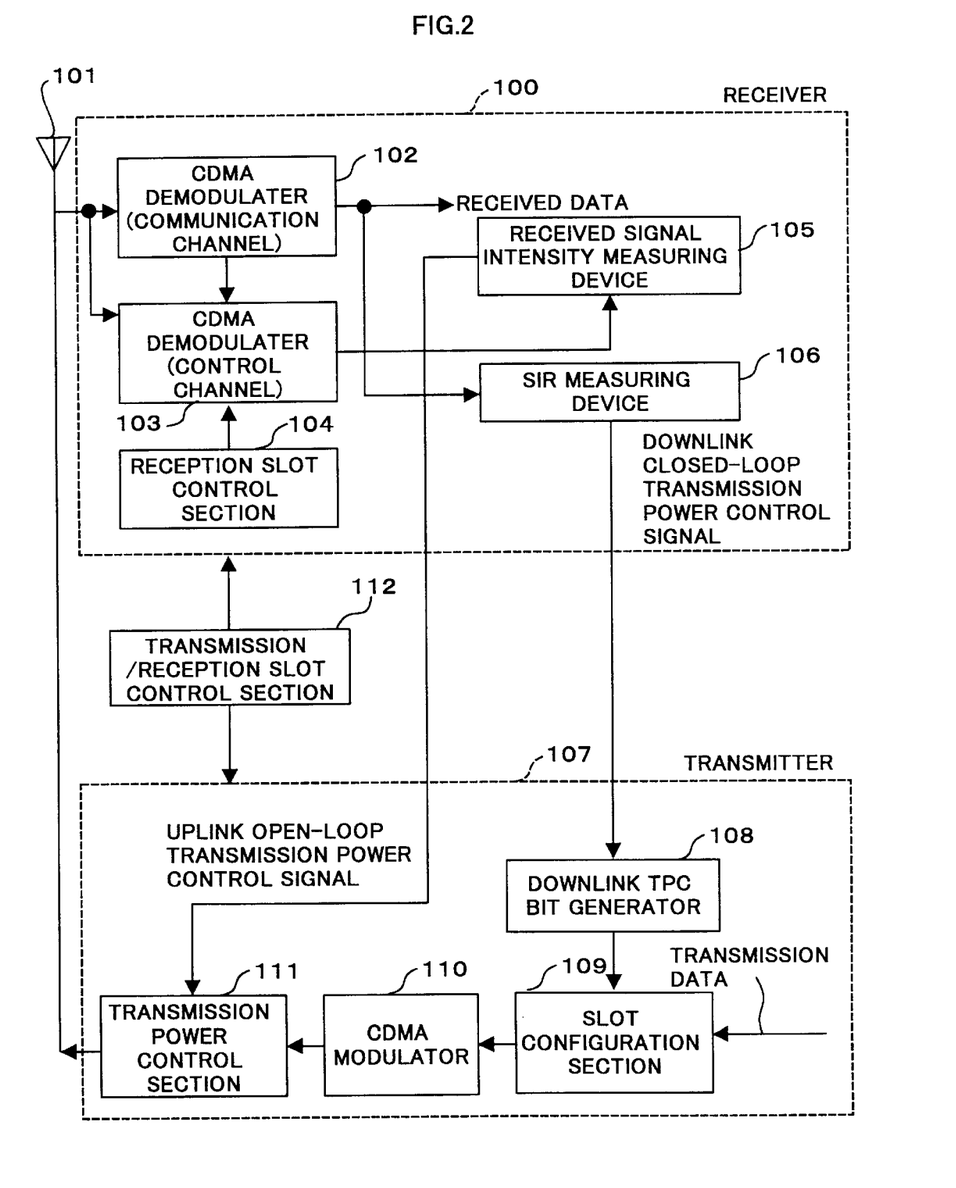
FIG. 2 is a block diagram showing a configuration of a communication terminal apparatus in a radio communication system of an embodiment of the present invention.

FIG. 2 is a block diagram showing a configuration of a communication terminal apparatus in a radio communication system of Embodiment 1 of the present invention. This communication terminal apparatus mainly comprises one or a plurality of antennas 101, receiver 100, transmitter 107 and transmission/reception slot control section 112.

Receiver 100 comprises CDMA demodulator 102 for communication channels, CDMA demodulator 103 for broadcast channels, reception slot control section 104 that controls the timing of a reception slot to be demodulated, received signal intensity measuring device 105 that measures intensities of received communication channel and control channel signals and SIR measuring device 106 that measures SIR (signal to interference ratio) of received communication channel and control channel signals.

On the other hand, transmitter 107 comprises downlink TPC bit generator 108, slot configuration section 109, CDMA modulator 110 and transmission power control section 111. Transmission/reception slot control section 112 controls the timing of transmission/reception slots between receiver 100 above, transmitter 107 above and other users.

Figure 3:
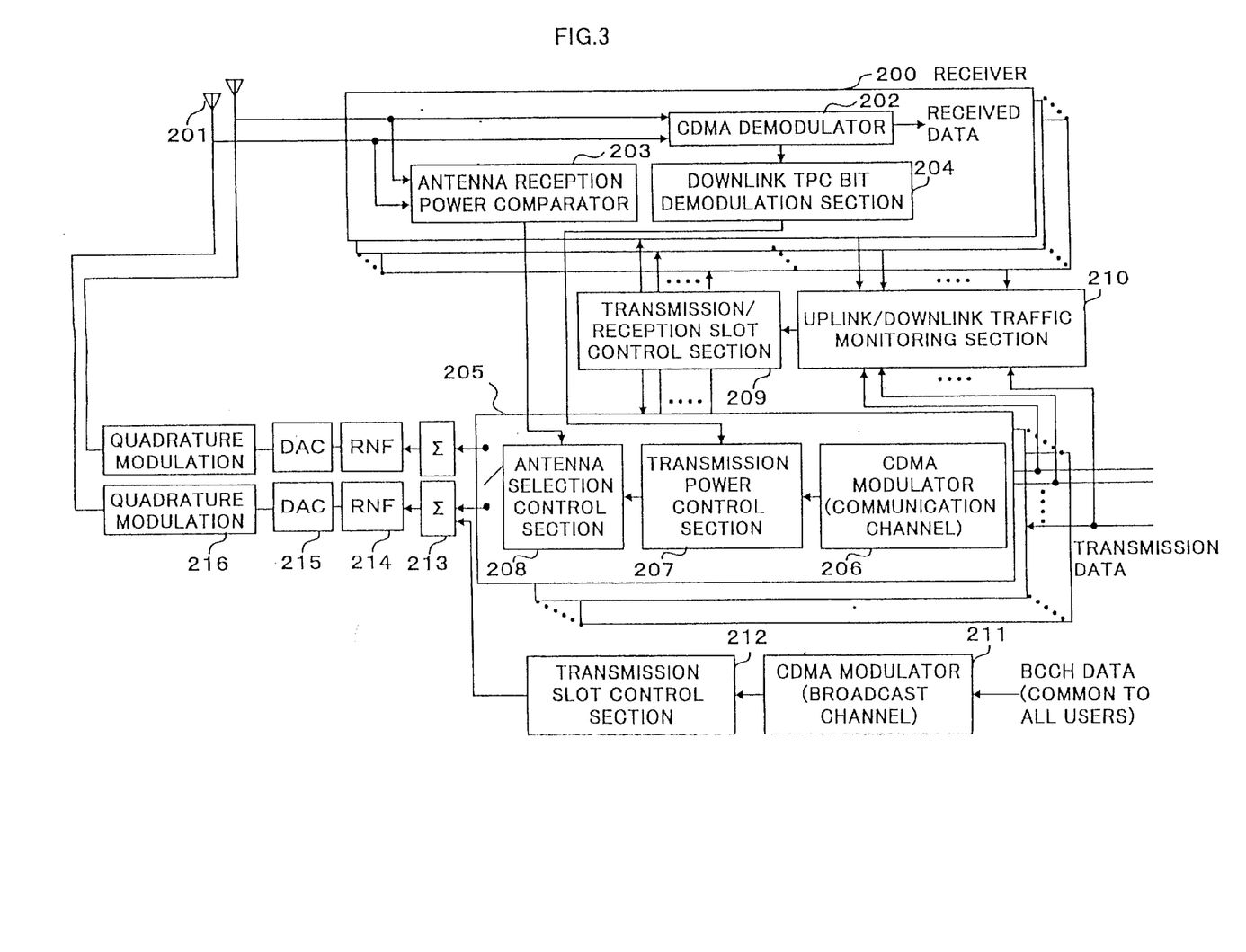
FIG. 3 is a block diagram showing a configuration of a base station communication apparatus in the radio communication system of the embodiment above.

FIG. 3 is a block diagram showing a configuration of a base station communication apparatus in the radio communication system of Embodiment 1 of the present invention. This base station communication apparatus mainly comprises one or a plurality of antennas 201, receiver 200, transmitter 205 and transmission/reception slot control section 209 and uplink/downlink traffic monitoring section 210.

Receiver 200 comprises CDMA demodulator 202, antenna reception power comparator 203 and downlink TPC bit demodulator 204.

Transmitter 205 comprises CDMA modulator 206 for communication channels, transmission power control section 207, antenna control section 208, CDMA modulator 211 for broadcast channels (common to all users), transmission slot control section 212, adders 213 corresponding in number with the antennas, transmission Nyquist filters 214 corresponding in number with the antennas, D/A converters 215 corresponding in number with the antennas and quadrature modulators 216 corresponding in number with the antennas. On the other hand, transmission/reception slot control section 209 controls transmission/reception slots between receiver 200 above, transmitter 205 above and other users. Uplink/downlink traffic monitoring section 210 monitors the traffic state on the uplink and downlink and sends its information to transmission/reception slot control section 209.

Then, the operation of the radio communication system equipped with the communication terminal apparatus and base station communication apparatus having the configuration above is explained below.

First, uplink/downlink traffic monitoring section 210 on the base station communication apparatus side monitors the traffic or service situation of the uplink and downlink, for example, monitors whether it is a public service or home service. Based on the result obtained, transmission/reception slot control section 209 determines and controls transmission/reception slot configuration patterns. The transmission/reception slot configuration patterns will be described later.

In the base station communication apparatus, the received signal incorporated into receiver 200 for each code, that is, communication channel code or broadcast channel code by transmission/reception slot control section 209 is demodulated to data by CDMA demodulator 202. Downlink TPC bit demodulator 204 obtains and demodulates a downlink TPC bit from the received signal.

The demodulated TPC information is sent to transmission power control section 207. The received signal is also incorporated into antenna reception power comparator 203, the antenna with the best channel condition is selected and the antenna selection control signal is sent to antenna selection control section 208.

Then, a transmission signal for each code is generated by CDMA modulator 206 for communication channels, transmission power control is performed by transmission power control section 207, broadcast channel data common to all users are also controlled by transmission slot control section 212 and generated by CDMA modulator 211. These broadcast channel data are stored in one slot of each subframe composing a frame with the same power. Or, the broadcast channel data are stored in one slot of each subframe composing a frame as system-specific data. Antenna selection is not made for broadcast channels.

A transmission signal for each code generated is output by transmission/reception slot control section 209 with a transmission slot timing, added up by adders 213 for respective antennas, with their waveforms reshaped by Nyquist filters 214, converted from digital to analog by D/A converters 215, then quadrature modulated by quadrature modulators 216 and transmitted. A broadcast channel signal is only transmitted with a timing corresponding to the last downlink time slot in a subframe of a communication channel signal made up of frames with a TDMA structure including a subframe made up of a plurality of time slots.

On the other hand, in the communication terminal apparatus, transmission/reception slot control section 112 controls transmission/reception slot configuration patterns based on the transmission/reception slot configuration information transmitted from the base station communication apparatus. The data of the received signal incorporated into receiver 200 by transmission/reception slot control section 112 are reproduced by CDMA demodulator 102 for communication channels and at the same time controlled by reception slot control section 104 and demodulated by CDMA demodulator 103 for broadcast channels. CDMA demodulator 103 for broadcast channels only demodulates a broadcast channel signal received with a timing corresponding to the last downlink time slot in the subframe of the communication channel made up of frames with a TDMA structure including a subframe made up of a plurality of time slots. This allows power consumption due to demodulation in the communication terminal apparatus to be reduced.

Furthermore, the received signal is sent from CDMA demodulator 102 for communication channels to SIR measuring device 106, subjected to reception SIR measurement, and based on the result a downlink closed-loop transmission power control signal is sent to downlink TPC bit generator 108 of transmitter 107. The downlink TPC bit is sent to slot configuration section 109 for slot configuration and carried on the transmission signal.

On the other hand, a broadcast channel signal is sent from CDMA demodulator 103 for broadcast channels to received signal intensity measuring device 105, subjected to received signal power, and based on the result an uplink open-loop transmission power control signal is sent to transmission power control section 111 of transmitter 107. Then, this transmission signal is modulated by CDMA modulator 110 and transmitted by transmission/reception slot control section 112 via transmission power control section 111.

Figure 4:
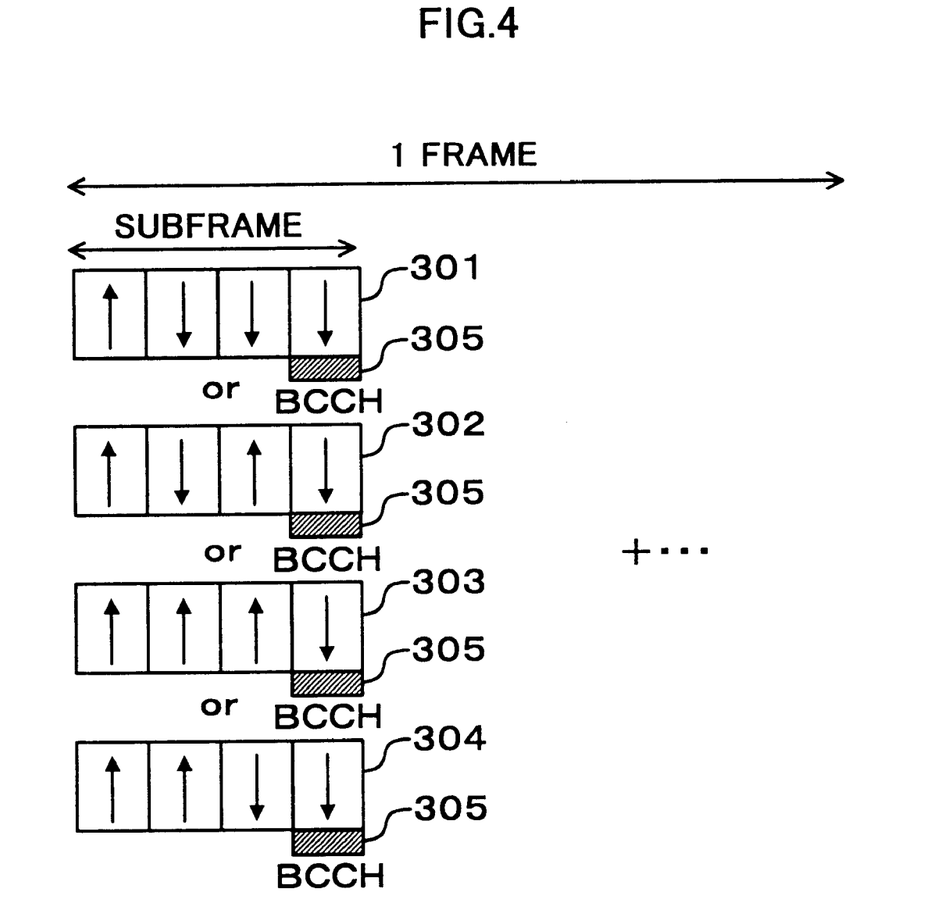
FIG. 4 is a frame configuration chart showing transmission/reception slot configuration patterns used in the radio communication system of the embodiment above.

Here, the transmission/reception slot configuration patterns controlled by the base station communication apparatus above are explained using FIG. 4. These slot configuration patterns result from dividing one frame (16 slots) into several subframes and determining transmission/reception timing patterns in subframe units based on the traffic monitoring result. The number of subframes is identical to the TDMA multiplexing number in the TDMA structure.

FIG. 4 shows a case where one frame is divided into 4 subframes. This number of subframes can be not only 4 but also 2 or 8, for example. Within a subframe, if the start slot is fixed as an uplink slot and the last slot as a downlink slot, the slots in between can be selected from a plurality of patterns (4 patterns). In the case of FIG. 4, slots can be selected from 4 patterns of <up, down, down, down>, <up, down, up, down>, <up, up, up, down> and <up, up, down, down>. This makes it possible to flexibly respond to a variety of services including asymmetric services.

The communication terminal apparatus needs only to receive broadcast channels through specific slots, and therefore can easily change the slot configuration of each subframe, providing flexibility for the system design. For example, by fixing slots where broadcast channels signals exist and only changing the distribution of uplink and downlink slots, it can handle both a system carrying out symmetric transmission and a system carrying out asymmetric transmission.

Using a TDMA structure for the frame configuration makes it possible to use a different slot configuration for each subframe and flexibly respond to self-operated services, avoiding the problem of interference in self-operated services in particular. The explanation above refers to the case where the start (first) slot and last slot are fixed, but the start (first) slot and last slot need not be fixed.

Under normal conditions, a problem of great interference occurs if uplink and downlink slots are assigned to a same slot timing in relation to a base station communication apparatus in the neighborhood, and therefore it is desirable to control not to use same transmission/reception slots. But if interference is immaterial, different base station communication apparatuses can have different transmission/reception slot configurations.

In the present embodiment, broadcast channels (BCCH) are transmitted using the last downlink slot of each subframe. The method of transmitting broadcast channels varies between public services and home (private, local area) services, but its basic configuration remains the same.

Figure 5:
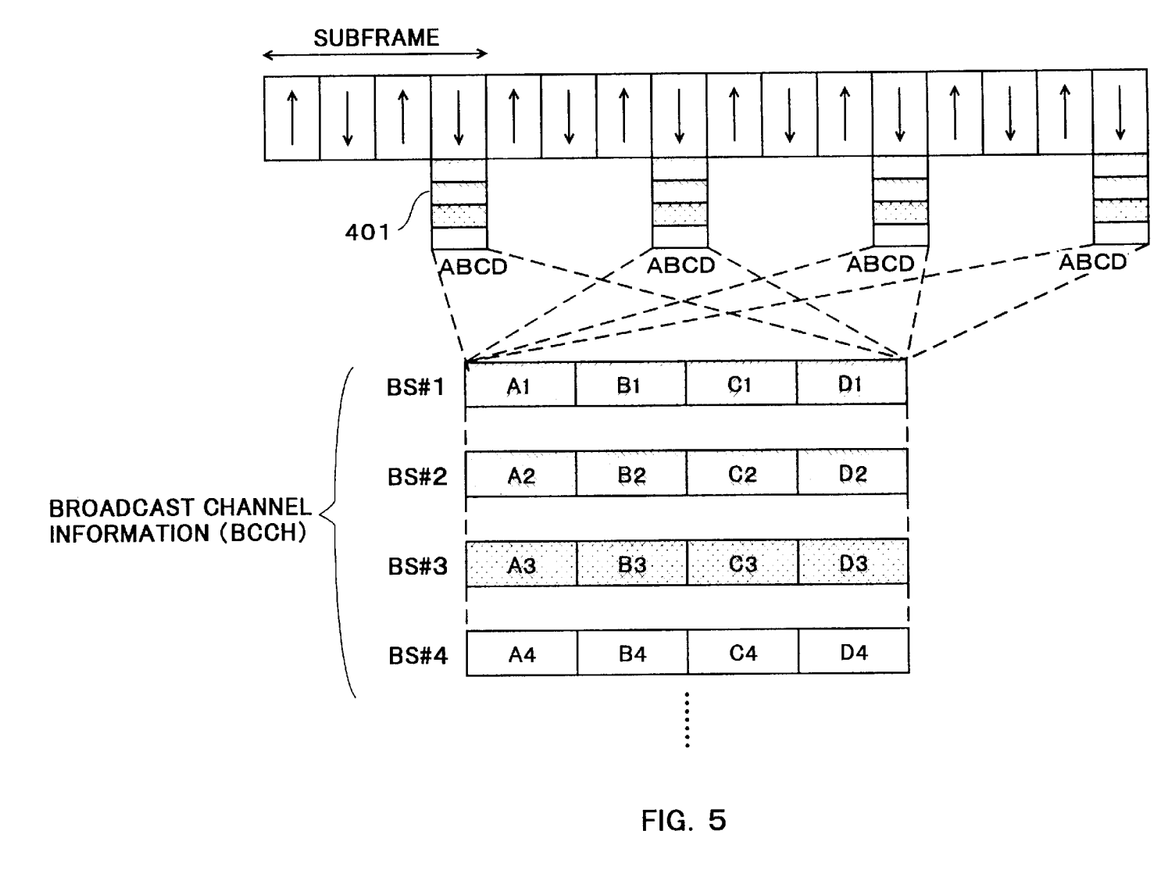
FIG. 5 is a frame configuration chart showing a transmission/reception slot configuration and a broadcast channel structure used for public services in the radio communication system of the embodiment above.

FIG. 5 shows a broadcast channel structure for public services when the number of subframes is 4. Each base station communication apparatus transmits broadcast channel 401 to be transmitted only using the last downlink slot of a subframe and repeatedly transmits the same information using the last downlink slots of all subframes. Thus, repeatedly transmitting the same information can keep low the transmission power of a broadcast channel signal to be transmitted for one subframe. This broadcast channel information contains compressed information of A to D of each of communication terminal apparatus BS#1 to BS#4 and is stored in the last downlink slot. Thus, transmitting broadcast information 401 to be transmitted only through the last downlink slot of a subframe can suppress interference by broadcast channels.

When compared to a conventional way of transmitting broadcast channel information over one frame, the equivalent reception quality is achieved by synchronously adding up reception signals of all subframes corresponding to a unit frame (subframe, 1 frame, superframe), 1 frame, for example, if the equivalent transmission power is used. That is, since the same broadcast channel information can be distributed to downlink slots for a plurality of subframes, it is possible to keep low the transmission power of broadcast channel signals to be transmitted for one subframe.

Furthermore, transmission power control is not applied to broadcast channels, and therefore the reception quality varies a great deal due to fading. For this reason, if the transmission environment is optimal, it is possible to obtain information by only receiving a few subframes of a frame, one subframe of a broadcast channel, for example, and it is not necessary to receive broadcast channels in subsequent subframes. In this case, an instruction is issued to stop demodulation of the broadcast signal to provide a demodulation free time. This free time can also be used for monitoring to carry out a handover to a different frequency carrier or other system. Details will be given later.

Figure 6:
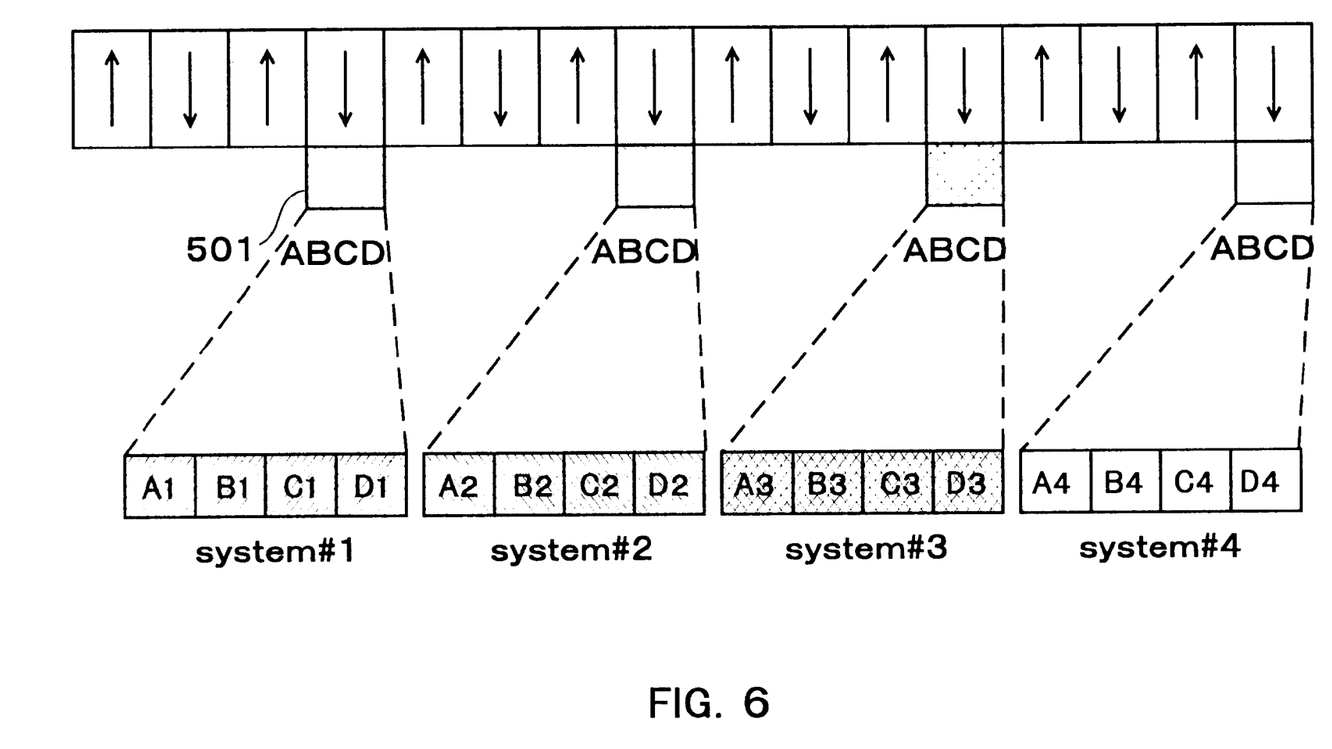
FIG. 6 is a frame configuration chart showing a transmission/reception slot configuration and a broadcast channel structure used for home services in the radio communication system of the embodiment above.

FIG. 6 shows a broadcast channel structure for home services when the number of subframes is 4. Each base station communication apparatus (each system) determines which subframe should be used to carry out communications during the initial operation of the system and transmits broadcast channel 501 to be transmitted only in the last slot of the subframe. If there is no problem with the level of interference, the same subframe can be used by a plurality of base station communication apparatuses (systems). According to this method, the maximum transmission rate that can be achieved is lower compared to communication using an entire frame, but if there is no problem with the level of interference, it is also possible to use other subframes when the transmission rate is not enough. Regarding the case shown in FIG. 6, the system can be designed so that information may be obtained by synchronously adding up the broadcast channel information of the last slot of one subframe over a plurality of frames.

Figure 7:
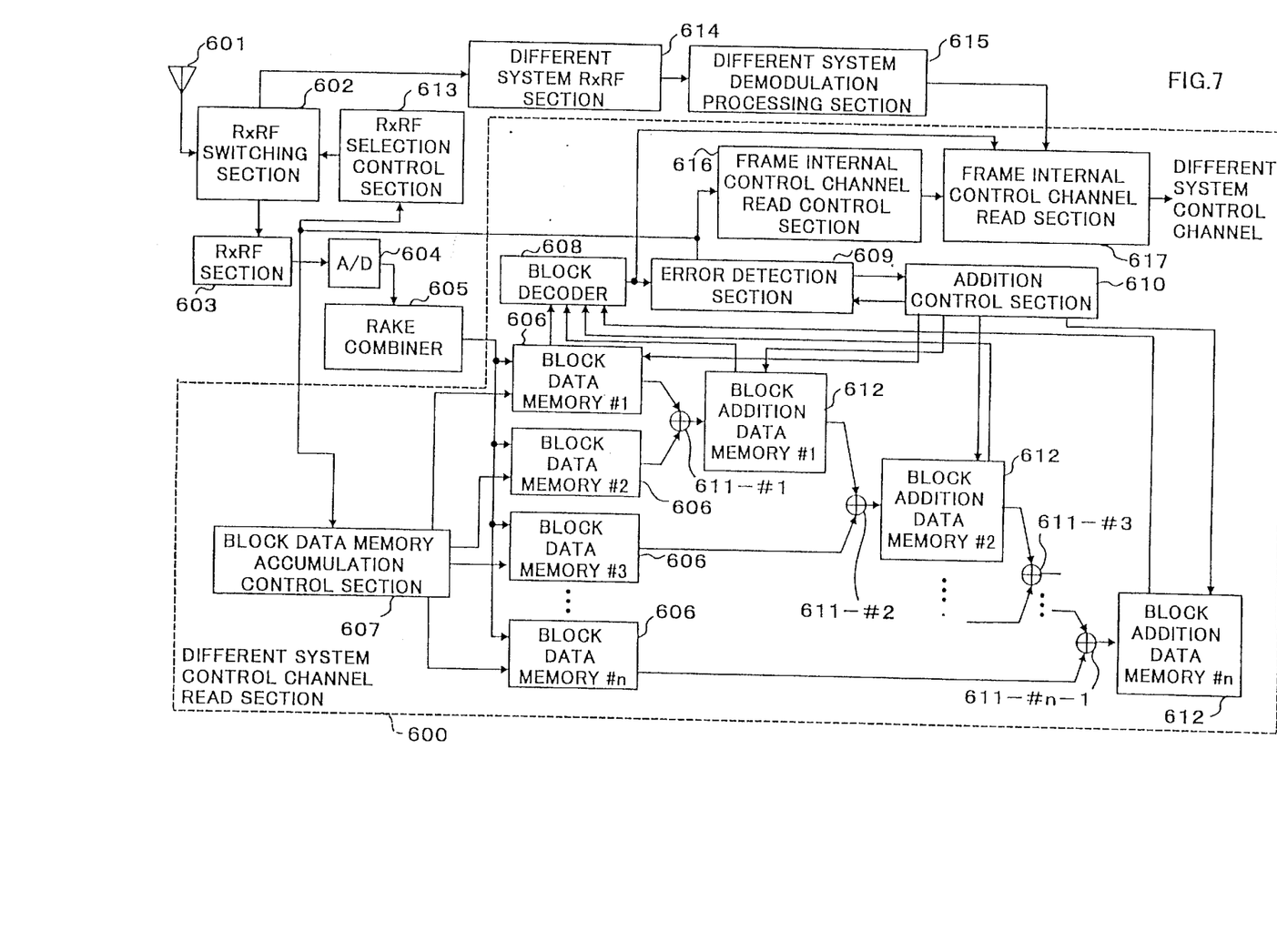
FIG. 7 is a block diagram showing the main part of the communication terminal apparatus of the embodiment above.
Figure 8:
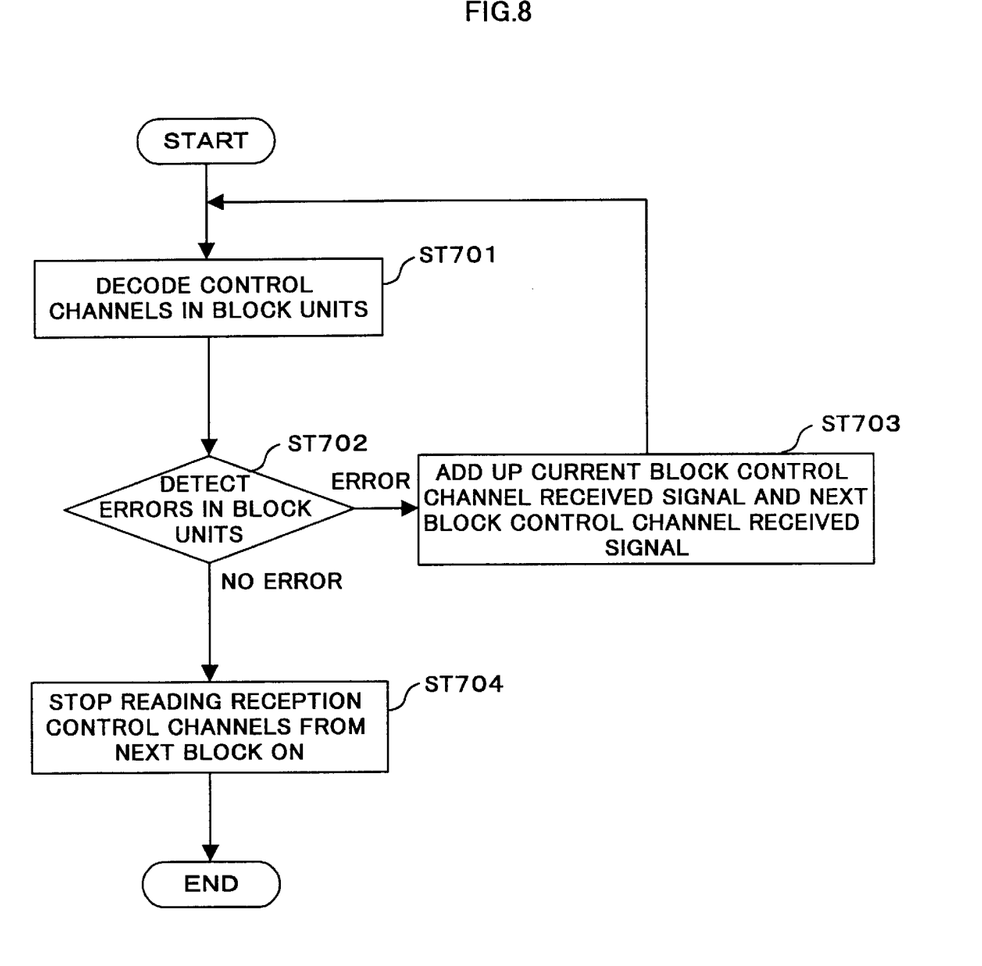
FIG. 8 is a flow chart to explain the saving of demodulation free time of the embodiment above.

Then, the method of the communication terminal apparatus forming the demodulation free time above is explained using FIG. 7 and FIG. 8. FIG. 7 is a block diagram showing the main part of the communication terminal apparatus of the present embodiment. FIG. 8 is a flow chart to explain the saving of demodulation free time of the present embodiment. Here, the process is explained by replacing slots with blocks.

First, its configuration is explained using FIG. 7. Antenna 601 receives an RF signal and sends it to RxRF section 603 via RxRF switching section 602 which will be explained later. RxRF section 603 drops the received signal from a carrier frequency to a baseband frequency. Further, A/D converter 604 converts it to a digital signal and RAKE combiner 605 performs RAKE combination.

Then, the received signal which has entered different system control channel read section 600 enters block data memory 606. There are n block data memories 606 and the first block data memory stores the start block data of broadcast channels repeatedly sent from the transmission/ reception apparatus on the base station at a double rate at least. n block data memories are stored within one frame one by one for each block. n can be determined arbitrarily. As will be described in detail, n needs to be at least the number of blocks within one frame, and therefore the minimum value of n depends on the order of multiplication of the rate at which the transmission/reception apparatus on the base station side carries out transmission. Block data memory accumulation control section 607 stores each block data in block data memories 606.

Block decoder 608 decodes data stored in block data memory 606 or block addition data memory 612 which will be described later. This decoding is carried out in block units or in units of blocks added up.

Error detection section 609 detects errors of the decoded data and notifies the detection result to block data memory accumulation control section 607, addition control section 610 which will be described later, frame internal control channel read control section 613 and the RxRF section selection control section.

There are n−1 adders 611 and they add up data stored in block data memories 606 or block data addition memories 612 and stores the result in block data addition memories 612. Addition control section 610 sends the data added up and stored in block addition data memories 612 to block decoder 608 for decoding. In order to reduce the size of the apparatus, it is possible to achieve processing similar to that described above by providing one of block data memories 606, one of adders 611 and one of addition data memories of the different system control channel read section and repeatedly using them in subframe units within a frame.

When RxRF section selection control section 613 receives from error detection section 609 notification that the error rate has not exceeded a threshold, it switches RxRF switching section 602 and operates different system RxRF section 614. That is, it stops reception of broadcast channels using RxRF section 603. Different system demodulation processing section 615 carries out A/D conversion, demodulation processing and decoding on control channels of a different system received by different system RxRF section 614 as the need arises.

When frame internal control channel read control section 616 receives from error detection section 609 notification that the error rate has not exceeded a threshold, it operates frame internal control channel read section 617. Frame internal control channel read control section 616 reads a control channel which is a candidate of the handover destination decoded from different system demodulation processing section 615.

Then, the procedure for the saving of demodulation free time is explained using FIG. 8. Antenna 601 receives broadcast channels repeatedly sent from the base station at a double rate at least. Then, in ST701, the start block stored in first block data memory 606 is decoded in block decoding section 608.

In ST702, error detection section 609 detects errors of the decoded start block. If the error rate exceeds a threshold, the step advances to ST703 and if the error rate is below the threshold, the step advances to ST704.

In ST703, when block data memory accumulation control section 607 receives an instruction that the error rate exceeds the threshold, it stores the second block data being demodulated or already demodulated by RAKE combination demodulation section 605 in second blockdata memory 606. Then, first adder 611 adds up data stored in first block data memory 606 and data stored in second block data memory 606 and stores the result in first block addition data memory 612. Addition control section 610 sends the addition result stored in first block addition data memory 612 to block decoding section 608.

When this processing in ST703 is completed, the step goes back to ST701 and data stored in first block addition data memory 212 are decoded by block decoding section 208, and the step advances to ST702 to carry out error detection. If the error rate exceeds the threshold, the step advances to ST703 again, and if the error rate is does not exceed the threshold the step advances to ST704.

ST701 to ST703 above are repeated until the error rate falls below the threshold. In ST703 on and after the second intent, block data memory accumulation control section 607 stores data of the block next to the one being demodulated or already demodulated (suppose the xth block) in xth block data memory 606. Then, xth adder 610 adds up data of (x−1)th block addition memory 612 and data of (x+1)th block data memory 606 and stores the result in xth block addition memory 612. Addition control section 611 sends the addition result stored in fist block addition data memory 612 to block decoding section 608.

In ST704, it is judged that the necessary data corresponding to one frame of a broadcast channel has been received and reception of the broadcast channel is stopped. That is, when RxRF section selection control section 613 receives from error detection section 609 notification that the error rate has not exceeded the threshold, it switches RxRF switching section 602 and operates different system RxRF section 614. Therefore, the rest of time until one-frame time elapses is secured as a free time and carrier control of a handover destination candidate is monitored.

Here, when the start block is decoded if the error rate is below the threshold and the RxRF section is switched, the broadcast channel data received by RxRF section 603 after the reception of the start block until the switching of the RxRF section are discarded the moment error detection section 609 outputs a result indicating that there is no error.

Thus, the transmission/reception apparatus on the base station communication apparatus side repeatedly transmits a block of compressed broadcast channel information corresponding to one frame within one frame, and thus the transmission/reception apparatus on the communication terminal apparatus that receives this can obtain one-frame information by only receiving one block at least. Then, by stopping reception of broadcast channels the moment it is confirmed that one frame of broadcast channel information has been obtained, it is possible to use the remaining time until a one-frame time elapses as a demodulation free time. To do this, error detection is performed one block at a time and if the error rate is below the threshold, reception is stopped and if it exceeds the threshold the next block with the same information is added up and blocks are received and added up one by one until the error rate falls below the threshold.

Thus, by completing reception of one-frame information in the least possible blocks, that is, the shortest possible time, it is possible to secure the remaining time within one frame as a demodulation free time for a cell search.

Figure 9:
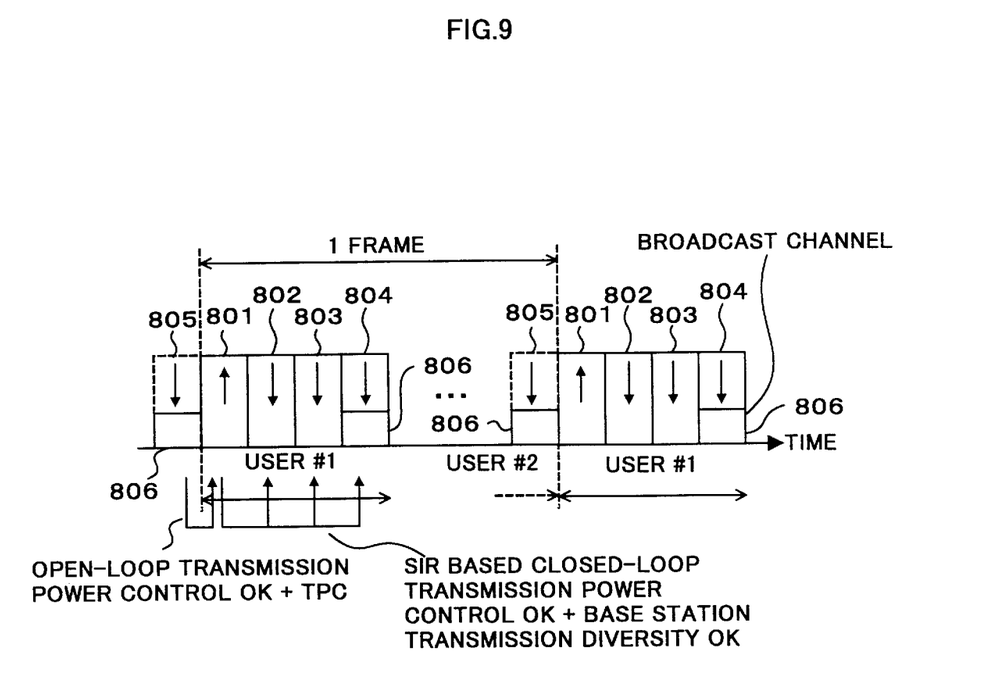
FIG. 9 is a drawing to explain the operations of uplink open-loop transmission power control and base station transmission diversity in the radio communication system of the embodiment above.

Then, a case where transmission power control is performed using broadcast channels in the radio communication system of the present invention is explained below. FIG. 9 is an example of a transmission/reception slot configuration used in the radio communication system of the present embodiment. FIG. 9 shows a case where one frame is divided into 4 subframes as in the case of FIG. 4. Using this figure, uplink open-loop transmission power control and base station transmission diversity during a public service are explained.

On the downlink, the base station communication apparatus transmits broadcast channel 806 to all users with a timing corresponding to the last downlink slot of a subframe. Here, when focused on user #1, broadcast channel 806 is also transmitted with downlink slot 805 before the 4 assigned slots 801, 802, 803 and 804. Therefore, the situation of the immediately preceding channel condition can be understood by monitoring the broadcast channel, or to put it concretely, by measuring the reception power of symbol data sent through the broadcast channel. Therefore, even in the case of a TDMA structure with a wide distance between a downlink slot and the next uplink slot, open-loop transmission power control is possible with uplink slot 801.

Furthermore, a signal transmitted by this uplink slot 801 contains a TPC bit for downlink SIR-based closed-loop transmission power control. On the other hand, downlink slots 802, 803 and 804 perform closed-loop transmission power control by demodulating the TPC bit transmitted by uplink slot 801. This allows sufficient follow-up for both the uplink and downlink even if fading changes drastically, thus improving the system performance. That is, open-loop transmission power control on the uplink can be implemented in combination with closed-loop transmission power control on the downlink, which improves the accuracy of transmission power control.

Taking into account transmission diversity in the base station communication apparatus, it is desirable to use the start (first) slot of a subframe for the uplink and the last (4th) slot for the downlink. This is because in order for the base station communication apparatus to carry out transmission diversity on the downlink, an uplink slot is required from the user who uses the subframe immediately before. Therefore, by using the first slot on the uplink and the 4th slot on the downlink, the communication terminal apparatus can perform transmission power control with high accuracy using broadcast channels, while the base station communication apparatus can perform transmission diversity with high accuracy using a received signal from the communication terminal apparatus. Furthermore, the use of a TDMA structure can relieve the problem of interference.

As described above, through a TDMA-structured CDMA/TDD, the present invention can suppress interference between systems during home services and provide the frame structure with commonality in public and home services. Furthermore, it can also make use of uplink open-loop transmission power control and base station transmission diversity.

The present invention is not limited to the above described embodiments, and various variations and modifications may be possible without departing from the scope of the present invention.

This application is based on the Japanese Patent Applications No.HEI 10-27711 filed on Jan. 26, 1998 and No.HEI 10-252992 filed on Sep. 7, 1998, entire content of which is expressly incorporated by reference herein.

What is claimed is:

1. A communication terminal apparatus, comprising:
   a communication controller that performs communication according to a CDMA/TDD scheme using signals having a frame configuration with a TDMA structure including subframes made up of a plurality of time slots, and
   a demodulator that demodulates only broadcast channel signals, each of which includes one frame of broadcast channel information, contained in a last time slot in said subframes.

2. The communication terminal apparatus according to claim 1, wherein said broadcast channel signals each contain identical broadcast channel information.

3. The communication terminal apparatus according to claim 1, further comprising:
   an error detector that performs error detection of said broadcast channel signals, and
   an instructor that instructs said demodulation section to stop demodulation in accordance with a result of the error detection.

4. The communication terminal apparatus according to claim 3, wherein, when the result of the error detection is acceptable, said instructor instructs stopping demodulation of broadcast channel signals received thereafter.

5. The communication terminal apparatus according to claim 4, wherein said demodulator, after receiving an instruction from said instructor to stop demodulation of broadcast channel signals, demodulates other broadcast channel signals.

6. The communication terminal apparatus according to claim 1, wherein said demodulator demodulates only system-specific broadcast channel signals.

7. The communication terminal apparatus according to claim 1, wherein a first time slot in said subframes is used on an uplink channel and a last time slot in said subframes is used on a downlink channel.

8. The communication terminal apparatus according to claim 7, wherein time slots other than the first and last time slots in said subframes are assigned to uplink and downlink channels according to traffic volume.

9. The communication terminal apparatus according to claim 1, further comprising:
   a measurer that measures a quality of a broadcast channel signal received immediately before a first time slot in said subframes; and
   a controller that controls transmission power of uplink channels based on a measured quality of a broadcast channel signal.

10. A base station communication apparatus, comprising:
    a communication controller that performs communication according to a CDMA/TDD scheme using signals having a frame configuration with a TDMA structure including subframes made up of a plurality of time slots; and
    a transmitter that transmits broadcast channel signals, each broadcast channel signal containing one frame of broadcast channel information, using only the last time slot in said subframes.

11. The base station communication apparatus, according to claim 10, said broadcast channel signals each contain identical broadcast channel information.

12. The base station communication apparatus according to claim 10, wherein said transmitter transmits only system-specific channel signals.

13. The base station communication apparatus according to claim 10, wherein a first time slot in said subframes is used on an uplink channel and a last time slot in said subframes is used on a downlink channel.

14. The base station communication apparatus according to claim 10, further comprising:

an acquiror section that acquires TPC information contained in communication channel signals of uplink channels; and a controller that controls transmission power of downlink channels based on said TPC information.

15. A wireless communication method, comprising:

transmitting, from a base station communication apparatus, signals having a frame configuration with a TDMA structure, which comprises subframes made up of a plurality of time slots, wherein only the last time slot in the subframes contains broadcast channel signals, each of which containing one frame of broadcast channel information;

receiving broadcast channel signals contained in the last time slot by a communication terminal apparatus; and demodulating the broadcast channel signals by the communication terminal apparatus.

16. The wireless communication method according to claim 15, further comprising:

performing error detection of broadcast channel signals by the communication terminal apparatus; and stopping, when the result of the error detection is acceptable, demodulation of said broadcast channel signals received thereafter.

* * * * *